United States Patent
You et al.

(10) Patent No.: US 9,529,361 B2
(45) Date of Patent: Dec. 27, 2016

(54) APPARATUS AND METHOD FOR MANAGING FAILURE IN AUTONOMOUS NAVIGATION SYSTEM

(71) Applicant: Hyundai Motor Company, Seoul (KR)

(72) Inventors: Byung Yong You, Gyeonggi-do (KR); Young Chul Oh, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 140 days.

(21) Appl. No.: 14/081,366

(22) Filed: Nov. 15, 2013

(65) Prior Publication Data

US 2015/0142244 A1   May 21, 2015

(30) Foreign Application Priority Data

Jul. 9, 2013   (KR) .......................... 10-2013-0080462

(51) Int. Cl.
*G01C 21/00* (2006.01)
*G05D 1/00* (2006.01)

(52) U.S. Cl.
CPC ............. *G05D 1/0061* (2013.01); *G01C 21/00* (2013.01)

(58) Field of Classification Search
CPC ........................................ G08G 1/16
USPC ........ 701/23, 117, 301, 31.4, 36, 41, 45, 70; 340/435, 436
See application file for complete search history.

(56) References Cited

U.S. PATENT DOCUMENTS

| | | | | |
|---|---|---|---|---|
| 8,198,996 B2* | 6/2012 | Golomb | ............... | B60Q 1/0082 340/465 |
| 8,446,265 B2* | 5/2013 | Golomb | ............... | B60Q 1/0082 340/425.5 |
| 2006/0089766 A1* | 4/2006 | Allard | .................. | G05D 1/0061 701/23 |
| 2008/0147265 A1* | 6/2008 | Breed | .................. | G07C 5/0808 701/424 |
| 2008/0294315 A1* | 11/2008 | Breed | .................... | B60N 2/002 701/49 |
| 2010/0030434 A1* | 2/2010 | Okabe | .................... | A61B 5/165 701/48 |
| 2010/0106356 A1 | 4/2010 | Trepagnier et al. | | |
| 2010/0198491 A1* | 8/2010 | Mays | .................... | B60W 30/09 701/124 |
| 2010/0222976 A1* | 9/2010 | Haug | .................... | B60K 28/04 701/70 |
| 2011/0071718 A1* | 3/2011 | Norris | .................... | H04L 67/12 701/23 |

(Continued)

FOREIGN PATENT DOCUMENTS

| | | |
|---|---|---|
| JP | 2006-044620 A | 2/2006 |
| JP | 2007-310698 A | 11/2007 |

(Continued)

*Primary Examiner* — Thomas G Black
*Assistant Examiner* — Wae Louie
(74) *Attorney, Agent, or Firm* — Mintz Levin Cohn Ferris Glovsky and Popeo, P.C.; Peter F. Corless

(57) ABSTRACT

An apparatus and method for managing failure in an autonomous navigation system are provided. The method includes collecting, by a controller, failure information in the autonomous navigation system and a monitoring a driver condition. The controller is configured to collect the failure information in the autonomous navigation system, and determine whether to switch control from the autonomous navigation vehicle to a manual driving mode based on the driver condition.

14 Claims, 2 Drawing Sheets

(56) References Cited

U.S. PATENT DOCUMENTS

| | | | | |
|---|---|---|---|---|
| 2012/0089299 A1* | 4/2012 | Breed | ............... | B60C 11/24 |
| | | | | 701/36 |
| 2013/0124046 A1* | 5/2013 | Lazic | ............... | B60K 28/066 |
| | | | | 701/42 |
| 2013/0342339 A1* | 12/2013 | Kiefer | ............... | G08B 6/00 |
| | | | | 340/438 |
| 2014/0022070 A1* | 1/2014 | Golomb | ............... | B60Q 1/0082 |
| | | | | 340/475 |
| 2015/0066284 A1* | 3/2015 | Yopp | ............... | B60W 30/00 |
| | | | | 701/29.2 |
| 2015/0142244 A1* | 5/2015 | You | ............... | G05D 1/0061 |
| | | | | 701/23 |

FOREIGN PATENT DOCUMENTS

| KR | 10-1998-0035001 A | 8/1998 |
|---|---|---|
| KR | 10-2011-0074629 A | 6/2011 |
| KR | 1020110060457 | 6/2011 |
| KR | 1020120052547 | 5/2012 |
| KR | 10-2013-0015739 A | 2/2013 |
| KR | 10-2013-0076218 A | 7/2013 |

\* cited by examiner

APPARATUS AND METHOD FOR MANAGING FAILURE IN AUTONOMOUS NAVIGATION SYSTEM

CROSS-REFERENCE TO RELATED APPLICATION

This application is based on and claims priority from Korean Patent Application No. 10-2013-0080462, filed on Jul. 9, 2013 in the Korean Intellectual Property Office, the disclosure of which is incorporated herein in its entirety by reference.

BACKGROUND

1. Field of the Invention

The present invention relates to an apparatus and a method for managing failure in an autonomous navigation system, and more particularly, to an apparatus and a method for managing failure in an autonomous navigation system that enables the autonomous navigation of a vehicle.

2. Description of the Prior Art

Among other technologies required by autonomous vehicles that can accomplish a given task in various circumstances, autonomous navigation technology that helps a vehicle move to a destination along a safe and optimal path has been developed. The autonomous navigation technology of an unmanned vehicle is configured as a global path-planning (GPP) and a local path-planning (LPP) based on a detecting area of sensors installed within the unmanned vehicle.

The global path-planning is a deliberate tier which sets a path to a destination in an off-line state, taking into consideration large scale topographic characteristics such as mountains and lakes and risk of a task based on digital elevation map (DEM)/digital surface map (DSM) and feature database (FDB) previously provided. Further, the local path-planning is a more responsive tier which extracts topographic information such as degrees of slopes, roughness and various obstacle information from a world modeling data having a range of tens of meters most recently acquired by various sensors, and sets a path to the next stopover point created in the global path-planning in real-time in view of safety and stability by utilizing the information.

When failure occurs in such an autonomous navigation system, the driving mode may be to manual driving mode. In other words, control may be switched from the autonomous navigation vehicle to a driver to allow the driver to drive the autonomous navigation vehicle.

SUMMARY

Accordingly, the present invention provides an apparatus and a method for managing failure in an autonomous navigation system that adaptively manages a driver's condition when failure occurs in the autonomous navigation system to prevent traffic accidents. Further, it will be easily appreciated that the objects and advantages of the present invention can be realized by means and a combination thereof recited in the accompanying claims.

In one aspect of the present invention, an apparatus for managing failure in an autonomous navigation system may include a plurality of units executed by controller. The plurality of units may include: an interconnecting unit configured to perform cooperation with an autonomous navigation system installed within a vehicle; a failure information collecting unit configured to collect failure information in the autonomous navigation system; a monitoring unit configured to monitor a driver's condition. The controller is configured to receive information regarding the driver's condition from the monitoring unit when the failure information collecting unit collects the failure information in the autonomous navigation system, and to determine whether to switch control to the autonomous navigation vehicle based on the driver's condition.

In another aspect of the present invention, a method for managing failure in an autonomous navigation system may include: collecting, by a controller, failure information in an autonomous navigation system installed within a vehicle; monitoring, by the controller, a driver's condition; switching, by the controller, control from an autonomous navigation vehicle to the driver when the driver maintains a forward gaze; determining, by the controller, a type of the failure information when the driver drives while drowsy or gazes in another direction other than the forward direction; delivering, by the controller, a control signal to the autonomous navigation system to stop the autonomous navigation vehicle when the failure information indicates hardware failure of the autonomous navigation system as a result of the determining; and delivering, by the controller, a signal instructing software reboot to the autonomous navigation system when the failure information indicates software failure of the autonomous navigation system as a result of the determination.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION

Figure 1:
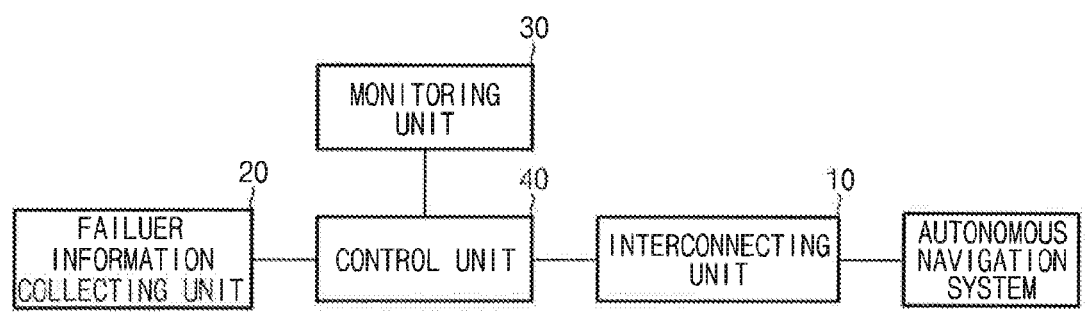
FIG. 1 is an exemplary block diagram of an apparatus for managing failure in an autonomous navigation system according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The above objects, features, and advantages will be more apparent from the detailed description with reference to the accompanying drawings and therefore, the technical ideas of the present invention can be easily practiced by a person with ordinary skill in the art to which the present invention pertains. In describing the present invention, when a detailed description of well-known technology relating to the present invention may be omitted if it is considered that it may unnecessarily obscure the gist of the present invention. Hereinafter, exemplary embodiments of the present invention will be described in detail with reference to the accompanying drawings.

FIG. 1 is an exemplary block diagram of an apparatus for managing failure in an autonomous navigation system according to an exemplary embodiment of the present invention. As shown in FIG. 1, the apparatus for managing failure in an autonomous navigation system may include a plurality of units executed by a controller 40. The plurality of units may include: an interconnecting unit 10, a failure information collecting unit 20, and a monitoring unit 30.

Specifically, the interconnecting unit 10 may provide an interface with the autonomous navigation system that enables autonomous navigation of a vehicle, and may be configured to operate the autonomous navigation vehicle by delivering a control signal from the controller 40 to the autonomous navigation system. The control signal may include a control signal that has an instruction to pull over the autonomous navigation vehicle onto a shoulder of a road or an emergency parking lot (e.g., direct the vehicle toward the shoulder or break down lane of a road), a control signal that has an instruction to pull over the autonomous navigation vehicle onto the edge of the outermost lane of a road, a control signal that has an instruction to pull over the autonomous navigation vehicle near a fixed obstacle, and a control signal that has an instruction to stop the autonomous navigation vehicle. Each of the control signals delivers the instruction to perform the respective operation, and various types of controls necessary for performing the operations may be executed by the autonomous navigation system.

The failure information collecting unit 20 may be configured to collect hardware failure information and software failure information regarding the autonomous navigation system. The failure information collecting unit 20 may be configured to collect the failure information in cooperation with an electronic control unit (ECU) of a vehicle or may be configured to collect the failure information directly via a vehicle communication network. In particular, the vehicle communication network may include a controller area network (CAN), a local interconnect network (LIN), a FlexRay, a media oriented system transport (MOST) and the like.

Furthermore, the monitoring unit 30 may be configured to monitor a driver's condition to determine when the driver is in a condition to take control of the autonomous navigation vehicle. In other words, the monitoring unit 30, executed by the controller 40, may be configured to determine whether to switch the control from the autonomous navigation vehicle (e.g., autonomous driving mode) to a manual driving mode. The driver's conditions may include maintaining a forward gaze direction, a drowsy condition, gazing in another direction other than the forward direction (e.g., not maintaining a forward gaze direction) and the like. The condition wherein the driver gazes in another direction may include a gazing down when, for example, reading a book, manipulating a mobile device, and the like.

When the failure information regarding the autonomous navigation system is collected by the failure information collecting unit 20, the controller 40 may be configured to receive information regarding the driver's condition by operating the monitoring unit 30 to determine when the driver may be able to control the autonomous navigation vehicle. When the monitoring unit 30 is already operating, the controller 40 may be configured to receive the information regarding the driver's condition directly from the monitoring unit 30.

Thereafter, the controller 40 may be configured to switch the control from the autonomous navigation vehicle to the driver when the driver is in an acceptable condition to control the autonomous navigation vehicle (e.g., a condition wherein a forward gaze is maintained). In switching the control, steering control may be first switched followed by acceleration/deceleration control, however, the present invention is not limited to this order.

Alternatively, when the driver is in an unacceptable condition to control the autonomous navigation vehicle (e.g., a condition wherein the driver is drowsy or gazes at another direction than the forward direction) the controller 40 may be configured to prevent the control of the autonomous navigation vehicle from being switched and may be configured to determine the type of the failure information collected by the failure information collecting unit 20. In particular, when the failure information indicates hardware failure of the autonomous navigation system, the controller 40 may be configured to output a control signal that has an instruction to stop the autonomous navigation vehicle and may be configured to transmit the control signal to the autonomous navigation system via the interconnecting unit 10.

In addition, when the failure information indicates software failure of the autonomous navigation system, the controller 40 may be configured to output a signal that instructs software reboot and may be configured to transmit the control signal to the autonomous navigation system via the interconnecting unit 10. When the autonomous navigation system is not recovered after the software reboot, the controller 40 may be configured to output a control signal that has an instruction to stop the autonomous navigation vehicle and may be configured to transmit the control signal to the autonomous navigation system via the interconnecting unit 10.

Accordingly, when a failure occurs in the autonomous navigation system, when the driver maintains a forward gaze (e.g., maintains a gaze in the driving direction of the vehicle), the controller 40 may be configured to switch the control from the autonomous navigation vehicle to the driver, and in response to determining a drowsy condition or a gaze in another direction other than the forward direction, the controller 40 may be configured to determine the type of the failure information, to deliver a control signal to the autonomous navigation system to stop the autonomous navigation vehicle when a hardware failure is determined, and may be configured to transmit a signal that instructs software reboot to the autonomous navigation system in response to determining a software failure. When the autonomous navigation system is not recovered after the software reboot, the controller 40 may be configured to output a control signal to stop the autonomous navigation vehicle and may be configured to transmit the control signal to the autonomous navigation system.

Furthermore, when the failure is contributed not by functionality of the autonomous navigation system but by control-switch functionality, the controller 40 may be configured to output a control signal having various instructions and transmit the control signal to the autonomous navigation system via the interconnecting unit 10. The various instructions may include: an instruction to pull over the autonomous navigation vehicle onto a shoulder of a road or an emergency parking lot; an instruction to pull over the autonomous navigation vehicle onto the edge of the outermost lane of a road; an instruction to pull over the autonomous navigation vehicle near a fixed obstacle; and an instruction to stop the autonomous navigation vehicle. In other words, at first, an attempt may be made to pull over the autonomous navigation vehicle onto the shoulder of a road or an emergency parking lot, and when such an option is unavailable, an attempt may be made to pull over the autonomous navigation vehicle onto the edge of the outermost lane of a mad. Further, when such an attempt is not available, an attempt may be made to pull over the autonomous navigation vehicle near a fixed obstacle, and when such an attempt is still not available, the autonomous navigation vehicle may be stopped.

Figure 2:
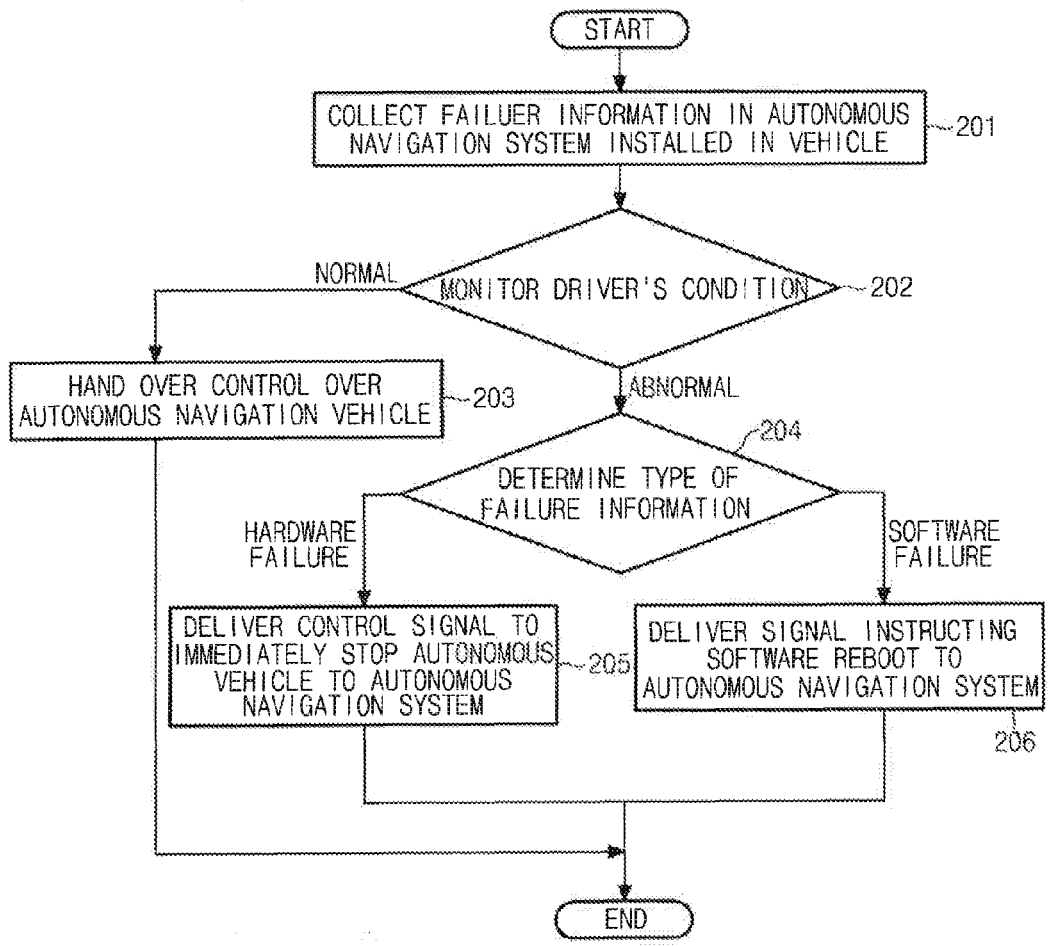
FIG. 2 is an exemplary flowchart illustrating a method for managing failure in an autonomous navigation system according to an exemplary embodiment of the present invention.

FIG. 2 is an exemplary flowchart illustrating a method for managing failure in an autonomous navigation system according to an exemplary embodiment of the present invention. Initially, a failure information collecting unit 20, executed by a controller 40, may be configured to collect failure information regarding an autonomous navigation system installed within a vehicle (201). A monitoring unit 30, executed by the controller 40, may be configured to monitor a driver's condition (202). Then, when the driver maintains a forward gaze, the controller 40 may be configured to switch the control from the autonomous navigation vehicle to the driver (203).

Furthermore, when the driver drives while drowsy or gazes at another direction other than the forward direction, the controller 40 may be configured to determine a type of the failure information (204). When the failure information indicates a hardware failure of the autonomous navigation system as a result of the determination (204), the controller 40 may be configured to transmit a control signal to the autonomous navigation system providing an instruction to stop the autonomous navigation vehicle (205). When the failure information indicates a software failure of the autonomous navigation system as a result of the determination (204), the controller 40 may be configured to transmit a signal to the autonomous navigation system that provides an instruction for software reboot (206).

The above-described method according to the exemplary embodiment of the present invention may be written in a computer program. Further, codes and code segments that configure the computer program may be deduced by computer programmers in the art. In addition, the computer program may be stored in a computer readable recording medium (information storage medium) and may be read and executed by a computer, to implement the method according to the exemplary embodiment of the present invention. The recording medium may include various types of storage medium readable by a computer.

According to an exemplary embodiment the present invention, by adaptively managing a driver's condition when a failure occurs in an autonomous navigation system, traffic accidents may be prevented. Further, when a failure occurs in an autonomous navigation system, by stopping an autonomous navigation vehicle in response to determining an unacceptable condition of a driver to take control from the autonomous navigation vehicle, traffic accidents may be prevented. In addition, when a software failure occurs in an autonomous navigation system, by automatically restarting the system in response to determining an unacceptable condition of the driver to control the autonomous navigation vehicle, the system may be recovered.

The present invention described above may be variously substituted, altered, and modified by those skilled in the art to which the present invention pertains without departing from the scope and sprit of the present invention. Therefore, the present invention is not limited to the above-mentioned exemplary embodiments and the accompanying drawings.

What is claimed is:

1. An apparatus for managing failure in an autonomous navigation system, the apparatus comprising:
   a memory configured to store program instructions; and
   a controller configured to execute the program instructions, the program instructions when executed configured to:
      collect failure information in the autonomous navigation system installed within an autonomous navigation vehicle, the failure information indicating a failure of the autonomous navigation system;
      monitor a driver condition;
      determine whether to switch control from the autonomous navigation vehicle to a manual driving mode based on the driver condition;
      switch the control from the autonomous navigation vehicle to the manual driving mode in response to determining a condition of maintaining a forward gaze; and
      when switching the control from the autonomous navigation vehicle to the manual driving mode in response to determining the condition of maintaining the forward gaze, sequentially switch the control by switching a steering control from the autonomous navigation vehicle to the manual driving mode and thereafter switching an acceleration/deceleration control from the autonomous navigation vehicle to the manual driving mode.

2. The apparatus according to claim 1, wherein the controller is configured to prevent a control switch from the autonomous navigation vehicle to the manual driving mode in response to determining an unacceptable driver condition.

3. The apparatus according to claim 2, wherein the unacceptable driver condition includes a drowsy condition or a condition of gazing in a direction that is not the forward direction.

4. The apparatus according to claim 2, wherein the controller is configured to:
   determine a type of the collected failure information, and
   transmit a control signal to the autonomous navigation system to stop the autonomous navigation vehicle when the failure information indicates a hardware failure in the autonomous navigation system, and
   transmit a signal instructing software reboot to the autonomous navigation system when the failure information indicates a software failure in the autonomous navigation system.

5. The apparatus according to claim 4, wherein the controller is configured to transmit a control signal to the autonomous navigation system to stop the autonomous navigation vehicle when the autonomous navigation system is not recovered after the software reboot.

6. The apparatus according to claim 1, when failure occurs in control-switch functionality of the autonomous navigation system, the controller is configured to:
   perform a first attempt to pull over the autonomous navigation vehicle onto a shoulder of a road or an emergency parking lot;
   perform a second attempt to pull over the autonomous navigation vehicle onto an edge of an outermost lane of the road in response to a failure of the first attempt,
   perform a third attempt to pull over the autonomous navigation vehicle near a fixed obstacle in response to a failure of the second attempt, and
   stop the autonomous navigation vehicle in response to a failure of the third attempt.

7. A method for managing failure in an autonomous navigation system, the method comprising:
   collecting, by a controller, failure information in the autonomous navigation system installed within an autonomous navigation vehicle, the failure information indicating a failure of the autonomous navigation system;
   monitoring, by the controller, a driver condition;
   switching, by the controller, control from the autonomous navigation vehicle to a manual driving mode in response to determining a maintained forward gaze;
   determining, by the controller, a type of the failure information in response to determining an unacceptable driver condition;
   transmitting, by the controller, a control signal to the autonomous navigation system to stop the autonomous navigation vehicle when the failure information indicates a hardware failure of the autonomous navigation system as a result of the determination of the failure type;
   transmitting, by the controller, a signal to the autonomous navigation system instructing software reboot when the failure information indicates software failure of the autonomous navigation system as a result of the determination of the failure type; and
   when switching the control from the autonomous navigation vehicle to the manual driving mode in response to determining the maintained forward gaze, sequentially switching, by the controller, the control by switching a steering control from the autonomous navigation vehicle to the manual driving mode and there-after switching an acceleration/deceleration control from the autonomous navigation vehicle to the manual driving mode.

8. The method according to claim 7, wherein the unacceptable driver condition includes a drowsy condition or a condition of gazing in a direction that is not the forward direction.

9. The method according to claim 7, wherein transmitting the signal instructing software reboot includes:
   transmitting, by the controller, a control signal to the autonomous navigation system to stop the autonomous navigation vehicle when the autonomous navigation system is not recovered after the software reboot.

10. The method according to claim 7, further comprising:
    in response to a failure occurring in control-switch functionality of the autonomous navigation system, transmitting, by the controller, a control signal to the autonomous navigation system to perform a first attempt to pull over the autonomous navigation vehicle onto a shoulder of a road or an emergency parking lot;
    in response to determining a failure of the first attempt, transmitting a control signal to the autonomous navigation system to perform a second attempt to pull over the autonomous navigation vehicle onto an edge of an outermost lane of a road;
    in response to determining a failure of the second attempt, transmitting a control signal to the autonomous navigation system to perform a third attempt to pull over the autonomous navigation vehicle near a fixed obstacle; and
    in response to determining a failure of the third attempt, transmitting a control signal to the autonomous navigation system to stop the autonomous navigation vehicle.

11. A non-transitory computer readable medium containing program instructions executed by a controller, the computer readable medium comprising:
    program instructions that collect failure information in an autonomous navigation system installed within an autonomous navigation vehicle, the failure information indicating a failure of the autonomous navigation system;
    program instructions that monitor a driver condition;
    program instructions that switch control from the autonomous navigation vehicle to a manual driving mode in response to determining a maintained forward gaze;
    program instructions that determine a type of the failure information in response to determining an unacceptable driver condition;
    program instructions that transmit a control signal to the autonomous navigation system to stop the autonomous navigation vehicle when the failure information indicates a hardware failure of the autonomous navigation system as a result of the determination of the failure type;
    program instructions that transmit a signal to the autonomous navigation system instructing software reboot when the failure information indicates software failure of the autonomous navigation system as a result of the determination of the failure type; and
    program instructions that, when switching the control from the autonomous navigation vehicle to the manual driving mode in response to determining the maintained forward gaze, sequentially switch the control by switching a steering control from the autonomous navigation vehicle to the manual driving mode and thereafter switching an acceleration/deceleration control from the autonomous navigation vehicle to the manual driving mode.

12. The non-transitory computer readable medium of claim 11, wherein the unacceptable driver condition includes a drowsy condition or a condition of gazing in a direction that is not the forward direction.

13. The non-transitory computer readable medium of claim 11, further comprising:
   program instructions that transmit a control signal to the autonomous navigation system to stop the autonomous navigation vehicle when the autonomous navigation system is not recovered after the software reboot.

14. The non-transitory computer readable medium of claim 11, further comprising:
   program instructions that perform a first attempt to pull over the autonomous navigation vehicle onto a shoulder of a road or an emergency parking lot, in response to a failure occurring in control-switch functionality of the autonomous navigation system;
   program instructions that perform a second attempt to pull over the autonomous navigation vehicle onto an edge of an outermost lane of the road in response to a failure of the first attempt,
   program instructions that perform a third attempt to pull over the autonomous navigation vehicle near a fixed obstacle in response to a failure of the second attempt, and
   program instructions that stop the autonomous navigation vehicle in response to a failure of the third attempt.

\* \* \* \* \*